United States Patent [19]
Basu et al.

[11] 3,835,745
[45] Sept. 17, 1974

[54] ARRANGEMENT FOR UNLOADING A FILM CARTRIDGE

[75] Inventors: Prithwis Basu, Munich; Guenter Neumann, Gruenwald; Jani Gaudek, Sallach Nr., all of Germany

[73] Assignee: AGFA Gevaert AG, Muenichen, Germany

[22] Filed: Nov. 1, 1973

[21] Appl. No.: 414,616

[30] Foreign Application Priority Data
Nov. 2, 1972  Germany............................ 2253707

[52] U.S. Cl......................... 83/285, 83/175, 83/334, 83/649
[51] Int. Cl. ........................................... G03d 15/00
[58] Field of Search ............ 83/175, 285, 293, 370, 83/649, 308, 334

[56] References Cited
UNITED STATES PATENTS
3,807,264   4/1974   Jessop............................. 83/649 X Primary Examiner—J. M. Meister
Attorney, Agent, or Firm—Michael S. Striker

[57] ABSTRACT

A receiver is dimensioned to coaxially accommodate a film cartridge and is provided with a slot-shaped opening which registers with an outlet slot of the film cartridge when the cartridge is so accommodated in the receiver. The receiver is pivoted for pivotal movement about an axis which is laterally offset with reference to the axes of the receiver and the cartridge, and a cutting arrangement is provided outside the opening of the receiver in the path of the film being withdrawn through the same. The cutting arrangement is connected with the receiver in such a manner that when the receiver pivots beyond a certain extent under the pull of film being withdrawn, the cutting arrangement will cut the film.

8 Claims, 4 Drawing Figures

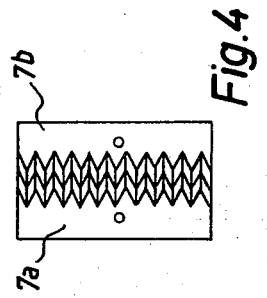
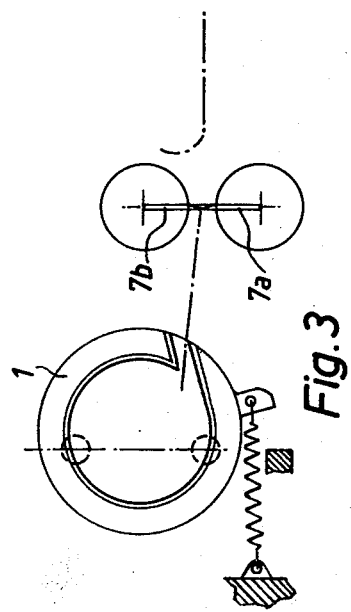
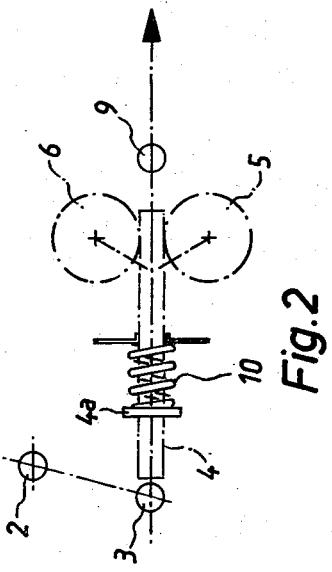
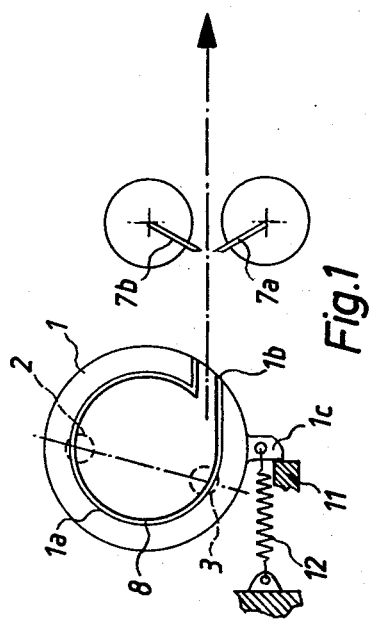

ARRANGEMENT FOR UNLOADING A FILM CARTRIDGE

BACKGROUND OF THE INVENTION

The present invention relates to an arrangement for unloading a film cartridge having an outlet slot through which film can be withdrawn. More particularly, the invention relates to such an arrangement for unloading a film cartridge wherein the inner end of the film is connected with the cartridge.

Film cartridges have a central core member about which the film is convoluted. The inner end of the film is connected with this core member, and it is known from the prior art that this connection can be carried out in various different ways. In some types of film cartridges a hook-shaped portion on the core member extends through the end portion of the film, and when the latter is to be removed from the cartridge it is simply withdrawn until only the end portion remains connected with the hook portion of the core member. An additional tug on the film will then tear the latter so that it comes loose from the core member. Since no adhesive connection is employed in this arrangement, no adhesive residue can adhere to the end portion of the film.

However, the prior art also knows film cartridges wherein the inner end portion of the film is indeed connected adhesively with the winding core. This does not mean that the film cannot be separated from the winding core when the cartridge is unloaded, by exerting sufficient pull on the film. If so, the film will come loose and unloading can be completed. However, in this arrangement there will inevitably be an adhesive residue remaining on the end portion of the film and this can disadvantageously influence further processing of the film. For this reason, it has heretofore always been necessary to cut off that end portion of the film which contains such adhesive residue.

SUMMARY OF THE INVENTION

It is a general object of the present invention to avoid the disadvantage of the prior art.

More particularly, it is an object of the present invention to provide an arrangement for unloading film cartridges which assures that the film will come out of the cartridge without containing any adhesive residue on it.

Still more particularly, the present invention provides for an arrangement for unloading of film cartridges wherein the end portion of the film which is connected with the winding core of the cartridge, and whereon in the case of forcible severing from the cartridge adhesive residue would remain, will be retained in the cartridge itself when the film is unloaded.

In keeping with the above objects, and with others which will become apparent hereafter, one feature of the invention resides in an arrangement for unloading a film cartridge having an outlet slot by withdrawing film through the slot. The arrangement comprises a receiver dimensioned to coaxially accommodate a film cartridge and having a slot-shaped opening which registers with the outlet slot when the cartridge is so accommodated in the receiver. Mounting means mounts the receiver for pivotal movement about a pivot axis which is laterally offset with reference to the axes of the receiver and cartridge. Cutting means is provided outside the opening in the path of film being withdrawn through the same. This cutting means is linked with the receiver and is operative for cutting the film in response to a predetermined pivotal displacement of the receiver about the pivot axis of the same, which displacement is caused by the pull of the film being withdrawn.

As the film is being withdrawn, the force which it exerts upon the receiver is not sufficient to cause the same to pivot to such an extent that the cutting arrangement would operate and cut the film. However, when the film has been completely unbound, and is merely still connected with the core of the cartridge at its inner end, then further pulling on the film will exert sufficient force upon the receiver to pivot the same about its pivot axis and to thus trigger the severing action of the cutting device. This assures an automatic severing of the already withdrawn film from the small end portion that remains in the cartridge and remains adhesively connected with the winding core thereof, and avoids the possibility that any adhesive residue might remain on that portion of the film that has been withdrawn. Moreover, the particular location of the cut on the film, that is the length of the end portion which remains connected with the winding core when the rest of the film is severed from it, can be selected quite freely by appropriate positioning of the cutter blades.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanhing drawing.

BREIF DESCRIPTION OF THE DRAWING

FIG. 1 is a somewhat diagrammatic side view of one embodiment of the invention;

FIG. 2 illustrates, in a partly diagrammatic showing, the kinematic connection between the cutting arrangement and the receiver in the embodiment of FIG. 1;

FIG. 3 illustrates the embodiment of FIG. 1 in a somewhat different relative position; and FIG. 4 is a plane view of the cutting blades used in FIGS. 1–3.

DESCRIPTION OF THE PREFERRED EMBODIMENTS

Discussing the drawing in detail, wherein FIGS. 1–4 illustrate a single exemplary embodiment of the present invention, it will be seen that reference numeral 8 identifies a conventional film cartridge which is inserted into a receiver 1 for unloading of the film from the cartridge. The receiver 1 advantageously has a vertical orientation, that is a longitudinal axis of its interior space into which the cartridge 8 is to be inserted, is a vertically oriented axis. However, it is conveivable to orient the axis in a different direction.

In any case, the interior of the receiver 1 is identified with reference numeral 1a and essentially of circular cross section. It has a slot-shaped outlet opening 1b with which the outlet slot of the cartridge 8 registers when the cartridge 8 is received in the interior 1a. Due to the particular configuration of the slot-shaped outlet portion 1b, and the outlet of the cartridge 8 itself, the interior cross section of the space 1a and the exterior cross section of the cartridge 8 are not completely circular, so that the cartridge 8 can be inserted in only one direction and orientation into the space 1a, that is in such an orientation that the outlet of the cartridge 8 will automatically be aligned with the outlet opening 1b.

A device of entirely conventional construction is used for withdrawing the film from the cartridge through the outlet opening 1b, for instance a pair of drawing rollers or the like, and such devices are so well known in the photographic industry that they require neither an illustration nor a description. Of course, the withdrawal could also be carried out manually.

According to the invention the receiver 1 is pivoted on a pin or shaft 2 the longitudinal axis of which extends parallel to the coaxial axes of the cartridge 8 and the space 1a. However, the axis of the pin 2 is laterally offset from the axes of the cartridge 8 and the space 1a, by approximately the diameter of the cartridge 8. Further, the receiver 1 is provided with a projection 1c which engages a stationary abutment 11 under the urging of a spring 12, one end of which is connected with the abutment 1c and the other end of which is connecting with a housing portion or the like.

Symmetrically with reference to the path of travel of the film being withdrawn, which is designated by the broken-line arrow in FIG. 1, there is arranged cutting means which in the illustrated embodiment uses two blades 7a and 7b. Each of these is turnable about an axis paralleling the axis of the space 1a. The cutting edges of the blades 7a and 7b are serrated, as shown clearly in FIG. 4, and so arranged that each tooth of one blade can enter into a gap between two teeth of the other blade. In their cutting position they will be located as shown in FIG. 4, but without touching one another. The spacing between the opposing edges of the blades is approximately 0.2 mm.

FIG. 2 shows particularly clearly that each of the shafts about which the blades 7a, 7b are pivotable is connected with a gear 5 or 6, respectively, and that these gears mesh with a toothed rack 4. The latter abuts a pin 3 provided on the receiver 1, being urged into such abutment by a spring 10 which on the one hand is connected with the housing of the arrangement (diagrammatically shown only), whereas on the other hand it abuts with its other end against a flange 4a of the rack 4. An abutment 9 is provided in the path of movement of the rack 4, which limits the displacement of the rack to the extent that it can turn the gears 5 and 6 only until the blades 7a, 7b assume the position illustrated.

As FIG. 3 shows, a cartridge 8 is inserted into the receiver 1 with an end portion of its film extending outwardly through the opening 1b. This end portion is inserted between the cutter blades 7a, 7b and is then engaged by a withdrawing device, for instance of the type disclosed in German allowed application 1,597,655, and withdrawn to be rolled up or the like.

When almost the entire film strip has been withdrawn from the cartridge 8, an abrupt braking of the film will take place, so that the latter exerts pull against its end portion which is adhesively connected with the core (not shown) on which it had previously been wound in the cartridge 8. This results in a displacement of the receiver 1 about the axis of the pin 2 against the action of the spring 12, and causes the pin 3 to displace the rack 4 towards the right in FIG. 2, with a concomitant compression of the spring 10. At the same time, the gears 5 and 6 are so turned that the cutter blades 7a, 7b will symmetrically move with their cutting edges into the path of the film so that the teeth of the cutting edges begin to engage the film. Since the film still continues to move it will aid in its own severing due to the fact that it tends to draw the blades 7a and 7b further towards the cutting position as soon as their teeth have begun to penetrate the film. The blades 7a and 7b continue to pivot inwardly against the film until they have completely severed the same, but since they never contact one another there is almost no wear upon the cutting edges.

Although the cut which is obtained is not a straight-line cut, due to the provision of the teeth on the cutting edges of the blades 7a and 7b, this is of no consequence since it is merely necessary that an adhesive strip be placed onto the trailing end portion of the severed film strip to temporarily retain it on the convoluted remainder of the film strip. The severed-off inner end of the film strip, that is the end which is adhesively secured to the core in the cartridge 8, remains connected with this core. Of course, if desired, the trailing end of the severed film strip can be cut straight in an additional cutting device.

As soon as the pull exerted by the film strip has ceased, due to complete severing of the film strip, the receiver 1 is urged back to its initial or rest position shown in FIG. 1, under the influence of the spring 12. The rack 4 with the blades 7a, 7b is returned to its rest position by the spring 10.

The spacing of the cutting edges of the blades 7a, 7b in the rest position (see FIG. 1) can be selected large enough so that scratching of the film by these cutting edges during withdrawal of the film is reliably excluded. The construction is so simple and easy to operate that it is inexpensive to produce and requires no supervision at all by skilled personnel.

It will be appreciated that the blades 7a, 7b could be replaced with a pair of blades having a different cutting edge, for instance a cutting edge which is so convoluted that it would produce a straight-line cut. Naturally, the requirements for producing such a cutting edge are more complicated than those for producing the serrated edges of the blades 7a and 7b, and thus such blades would be more expensive. Also, the rack 4 could be omitted, if the blades 7a, 7b were to be eccentrically mounted and driven via a rod by means of slot and pin connection.

It will be understood that each of the elements described above, or two or more together, may also find a useful application in other types of constructions differing from the type described above.

While the invention has been illustrated and described as embodied in an arrangement for unloaidng film from a cartridge, it is not intended to be limited to the details shown since various modifications and structural changes may be made without departing in any from the spirit of the present invention.

Without further analysis, the foregoing will so fully reveal the gist of the present invention that others cab by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for unloading a film cartridge having an outlet slot by withdrawing film through said slot, comprising a receiver dimensioned to coaxially accommodate a film cartridge and having a slot-shaped opening which registers with said outlet slot when said cartridge is so accommodated in said receiver; mounting means mounting said receiver for pivotal movement about a pivot axis which is laterally offset with reference to the axes of said receiver and cartridge; and cutting means outside said opening and in the path of film being withdrawn through the same, said cutting means being linked with said receiver and operative for cutting said film in response to a predetermined pivotal displacement of said receiver about said pivot axis which is caused by the pull of film being withdrawn.

2. An arrangement as defined in claim 1, said cutting means comprising a pair of turnable cutting blades and gears connected with said cutting blades for turning the same in mutually opposite directions.

3. An arrangement as defined in claim 2, wherein said cutting blades are mounted at opposite sides of said path and are turnable so as to extend into the same.

4. An arrangement as defined in claim 2, wherein said cutting blades have serrated cutting edges.

5. An arrangement as defined in claim 2, said cutting means comprising a linkage rod associated with said blades and shiftable to and from a position in which it turns said blades into said path; biasing means permanently urging said linkage rod away from said position, and engaging means on said receiver and engageable with said linkage rod to shift the same to said position in response to pivoting said receiver about said pivot axis.

6. An arrangement as defined in claim 5, wherein said linkage rod is a toothed rack.

7. An arrangement as defined in claim 3, wherein said blades are turnable into said path from a rest position, and wherein they extend in direction opposite to the withdrawal of film from said opening when in said rest position.

8. An arrangement as defined in claim 1, wherein said cartridge is of non-circular cross section; and wherein said receiver has an interior space for said cartridge which is also of non-circular cross section to assure insertion of said cartridge into said space in a predetermined orientation relative to said receiver.

* * * * *